United States Patent [19]
Allen et al.

[11] Patent Number: 4,735,540
[45] Date of Patent: Apr. 5, 1988

[54] ROBOTIC DISK HANDLER SYSTEM

[75] Inventors: Ronald Allen, San Jose; Tu Chen, Saratoga, both of Calif.

[73] Assignee: Komag, Inc., Milpitas, Calif.

[21] Appl. No.: 936,959

[22] Filed: Dec. 1, 1986

Related U.S. Application Data

[63] Continuation of Ser. No. 798,460, Nov. 15, 1985, abandoned.

[51] Int. Cl.$^4$ ............................................. B65G 65/00
[52] U.S. Cl. ................................. 414/222; 118/503; 204/298; 269/50; 294/65.5; 414/417; 414/744 A; 414/786; 414/908; 901/8
[58] Field of Search .............. 414/222, 225, 293, 304, 414/331, 403, 416, 417, 744 A, 786, 908; 294/65.5; 118/503; 269/47, 50, 51, 52; 901/8; 204/298; 369/290

[56] References Cited

U.S. PATENT DOCUMENTS

| | | | |
|---|---|---|---|
| 4,470,137 | 9/1984 | Tago | 369/290 X |
| 4,549,922 | 10/1985 | Oishi et al. | 269/47 X |
| 4,593,606 | 1/1986 | Foulke et al. | 414/787 X |
| 4,595,481 | 6/1986 | Allen et al. | 204/298 |
| 4,634,512 | 1/1987 | Allen et al. | 118/503 X |
| 4,650,064 | 3/1987 | Slabaugh | 118/500 X |

FOREIGN PATENT DOCUMENTS 739857 11/1955 United Kingdom ................ 369/290

OTHER PUBLICATIONS

Handling Equipment Article from Semiconductor Production, Autumn 1980.

*Primary Examiner*—Robert J. Spar
*Assistant Examiner*—Stuart J. Millman
*Attorney, Agent, or Firm*—Thomas S. MacDonald; Alan H. MacPherson; Paul J. Winters

[57] ABSTRACT

A robotic system includes a series of cassettes holding blank centrally apertured disks which are ejected in seriatim from each cassette and a plug inserted into the disk central aperture by manipulation of a robotic arm at that cassette position. Each disk is transported by the robotic arm and inserted into a series of disk-holding apertures in a carrier panel and, after processing of multiple disks in the panel, the processed disks are removed from the carrier panel by the robotic arm to a second cassette position where the plugs are removed from the processed disk and the plugs conveyed by a pair of robotic arms or by the robotic arm acting in conjunction with an auxiliary robotic arm for reinsertion into other blank disks. Sensors are provided for accurately positioning the robotic arm with respect to the position of the carrier panel to be loaded. The robotic arms may be programmed to tilt the grasped disk and plug with respect to the carrier panel to facilitate insertion or removal of the disks into the carrier panel.

31 Claims, 4 Drawing Sheets

ROBOTIC DISK HANDLER SYSTEM

This application is a continuation of application Ser. No. 798,460, filed Nov. 15, 1985, now abandoned.

CROSS REFERENCE TO RELATED APPLICATIONS

This application is related to U.S. patent application Ser. No. 06/642,853 filed Aug. 21, 1984, now U.S. Pat. No. 4,595,981 continuation-in-part U.S. application Ser. No. 798,554, filed Nov. 15, 1985, now U.S. Pat. No. 4,634,512 the disclosures of which as to the details of a disk carrier panel FIGS. 1-3 hereof and the details of various disk plug designs including that of FIG. 4 hereof, respectively, are incorporated herein by reference. Each of these applications have a common assignee.

FIELD OF THE INVENTION

This invention relates to a robotic apparatus and method for plugging and unplugging computer memory or other disks and loading the disks into a disk carrier panel for further disk processing and the subsequent removal of the disks from the panel. All operations are carried out in a clean-room environment to reduce impurities in the resultant disk product.

BACKGROUND

The manufacture of memory disks, as is well known, comprises coating by sputtering both sides of an aluminum or other suitable material blank with magnetic material such as an alloy of cobalt, nickel and chromium. The disk blank contains a central aperture which, in use, is mounted on the spindle of a disk drive. The manufacture entails transporting one or more disks held horizontally or vertically in a carrier panel past a pair of spaced horizontal or vertical electrodes where a plasma of material generated by the electrodes is sputtered on the disk opposed surfaces. As described in the first related patent application, it is desirable to prevent cross-contamination of material from one of the opposed electrodes during sputtering simultaneously from both electrodes. The related applications describe means for isolating the peripheral edges of each disk in a carrier panel and the central aperture of the disk so that there is effectively no cross-communication of sputtered particles from one side of the disk to the other. Originally, loading and unloading of disks was a hand operation where the disks were mounted on a carrier panel. In some instance no closure device was present for the disk central aperture. In other operations a suitable flap or screw plug was provided to temporarily close off each disk central aperture during the sputtering step. In other equipment, disks are first coated on one side and then after removal from a panel are flipped and reinserted so that the other side of the disk can be coated in a subsequent sputtering step.

The above systems are typified by the sputtering and disk handling systems of ULVAC of Japan, CPA Inc. of Milpitas, Calif. and Leybold-Haraeus Vacuum Products of Export, PA. The disk loading and unloading to and from the panel in these systems were designed mainly for manual loading and unloading.

SUMMARY

It is desired that faster blank disk loading and processed disk unloading operations be performed so that loading and unloading of multiple disks into a panel do not pace the sputtering operation on a continual series of panels passing through the overall production line. Further, it is critical that the loading and unloading operations do not contribute to contamination of the blank disk or completed disk either by generation of particles from manual loading and unloading or introduction and movement of auxiliary devices such as disk aperture closing plugs or by scratching or otherwise damaging the blank or finished surfaces of the disks during their handling. It is also desirable that a minimum inventory of closure plugs be utilized by providing that essentially each plug is continuously recycled and is in continual use in situ (other than in initial loading) and there is no necessity during operations to continuously introduce new plugs with their possible contaminants into the normally closed process environment. Plugs cannot be lost, mislaid or dropped to pick up contamination.

The above objectives are attained by providing a robotic system operable in a closed "clean-room" type chamber which is part of an in-line disk processing system where each of a series of panels are loaded with blank disks from a blank disk cassette. The filled panel is then conveyed to one or more disk processing stations and then proceeds back to a disk unload station which normally is immediately adjacent to the disk load station. The robotic system includes at least one robotic arm which grasps a knob portion of a disk plug which is mounted within a central aperture of blank disks after ejection of each disk in seriatim from a blank disk cassette. Once the plug is seated within the disk central aperture, the robotic arm grasps, holds and transports the disk and plug to the disk carrier panel and inserts the disk and plug into one of the multiple diskholding apertures in the carrier panel. In operations other than initial carrier panel loading the robotic arm is then directed by computer control or other type of automatic controlling device to another disk-holding aperture in the panel to grasp the previously inserted central plug of a processed disk and transports that processed disk to an unload station where the central plug is removed from the processed disk.

In one embodiment, a robotic arm, still grasping a first section of the plug, is returned to the loading station for insertion of that plug section to another blank disk. After transfer of the processed disk to a second cassette, the other section of the plug is directed back to the blank disk load station where the other plug section is mated with the first plug section in the next-in-line blank disk from the blank disk cassette. The other section of the plug is transported linearly or rotatively from the unload station to the load station by an auxiliary robotic arm. Alternatively, the auxiliary robotic arm may be designed as a pair of arms and programmed to load a new blank disk with both plug sections which were removed from the immediately previous processed disk and prepare a blank disk with the plug for pick-up by the first robotic arm.

An aspect of the invention is in providing a panel sensing mechanism in which precise square indexing depressions are provided on the carrier panel which are indicative of the centers of each of the disk-mounting apertures in the panel. The robotic system contains a seek-type sensor which probes the x, y and z axis edges and bottom surface of the depression to properly align the robot with respect to the carrier panel so that it will precisely place the grasped disk into and out of the disk-holding apertures. This is done when each panel arrives at the panel load/panel unload station. The probe compensates for any canting, misalignment or warping of the carrier panel in its loading and unloading position. A further feature of the invention involves the robotic tilting of a grasped plug and disk so as to prevent disk surfaces near to the edges of the disk from being scratched by the panel surfaces within the disk-holding apertures during the loading and unloading of the disk into and from the carrier panel. Alternatively or additionally, the carrier panel itself may be tipped to facilitate entry and removal of disks to and from the diskholding apertures of the panel.

DETAILED DESCRIPTION

Figure 1:
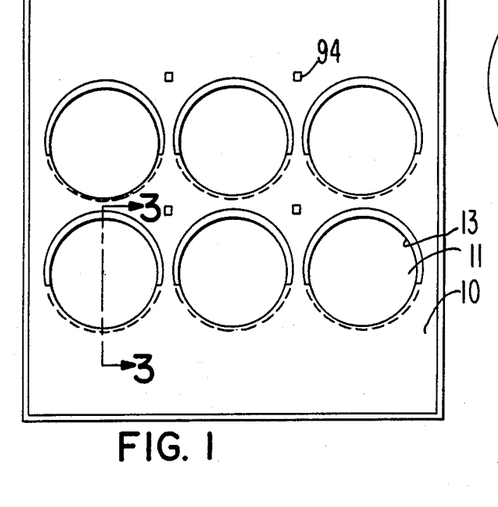
FIG. 1 is a front view of a typical carrier panel with disk-holding apertures.

FIG. 1 illustrates a panel carrier 10 with a plurality of disk-mounting apertures 11 for receipt of a corresponding number of blank disks. In a typical commercial embodiment, six or more apertures are provided in two, three or more horizontal rows of several aligned apertures.

Figure 2:
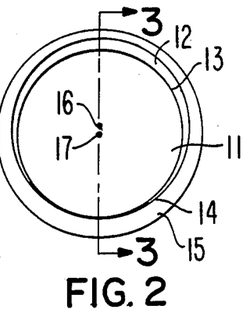
FIG. 2 is a detailed front view of a disk-holding aperture in a panel.
Figure 3:
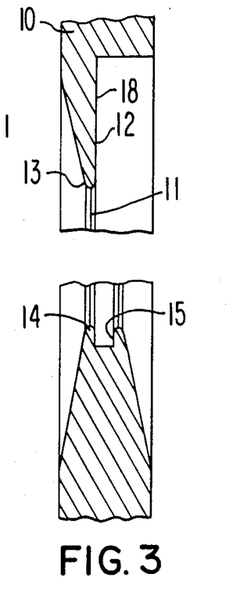
FIG. 3 is a cross-sectional side view of the disk-holding aperture.

Each aperture is constructed as shown in FIG. 2 so that an overall through aperture 11 is provided of a diameter 13 less than the total diameter of the disk to be mounted in the aperture. This blocks the edges of the disk from crosscontamination in the sputter coating of the disks. The top edge opening contains a recess 12 and the bottom edge 14 has an internal V-shaped or U-shaped groove 15. The recess 12 is formed by an arc about center point 16 and the opening diameter 13 and the groove 15 are both formed around center point 17. When inserted into an aperture the blank disk rests in groove 15 with its top outer peripheral edge resting in recess 12 on surface 18 (FIG. 3). No operable magnetically coated portion of the disk touches the panel during its insertion, coating or removal. It is contemplated that some of the disk-mounting recesses will be formed on each side of the panel allowing access of robotic arms simultaneously from both sides of the panel with attendant speed up of loading and unloading of disks in and out of the panel. In such instance the recesses 12 are formed on one side of panel 10 at certain apertures 11 and on the other side of the panel at the remainder of apertures 11.

Figure 4:
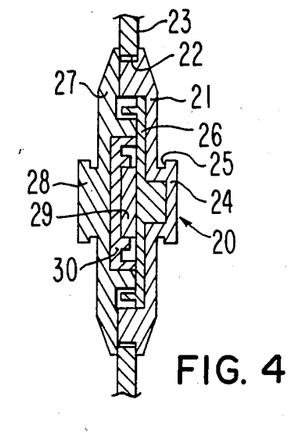
FIG. 4 is a cross-sectional view of a two-section plug for closing a disk central aperture and for handling the disk in panel loading and unloading operations.

FIG. 4 illustrates a magnetically connected plug 20 for closure of the central aperture 22 of a disk 23. Disk central plug 20 comprises a first plug section 21 having an exterior knob 24 thereon which is to be grasped by a robotic gripping means positionable within reentrant cavity 25 for moving the disk to various positions. A soft iron pole piece 26 is press-fitted within section 21. A second plug section 27 also having an exterior knob 28 is positioned on the opposite side of the overall plug 20 so that the plug can be mounted within and removed from the disk central aperture 22. A permanent magnet disk 29 is press-fitted or securely attached by other means into a second pole piece 30 so that a magnetic force holds the two plug sections together to seal the aperture 22 and to allow handling of the plug, and the disk to which it is connected, by suitable robotic fingers. To minimize rubbing and particle generation, the face surface of magnet 29 is spaced from pole piece 26 by a small amount e.g. 0.004 inches without effectively affecting the magnetic flux field holding the plug sections together.

Figure 5:
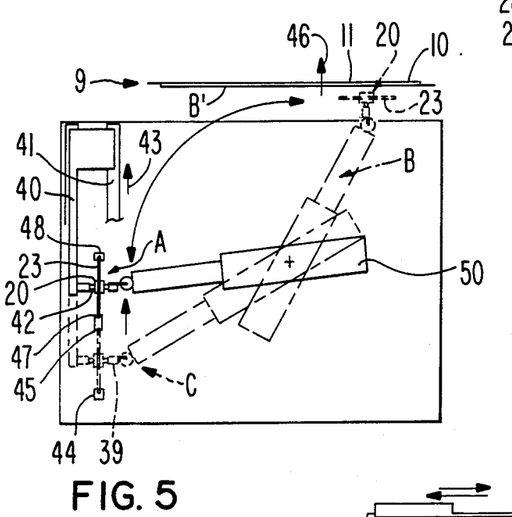
FIG. 5 is a schematic top view of a disk plugging/unplugging system and panel load/unload in-line system showing a basic robotic movement.

One embodiment of overall present invention concept is seen in FIG. 5 where robotic arms are provided to insert a plug into each disk central aperture after each disk has exited a cassette and to move such plugged disk gripped by a robotic arm for insertion into a carrier panel. The robotic arms for plug and unplug operations can be an independent linearly-moving common plugging arm robot having two opposite grippers for this operation or a single gripper arm on one section of the plug can be handled and plugged by the robotic arm used for insertion of the disk into a carrier panel. After the panel has been loaded with disks, it proceeds on suitable guide rails or other conveyor to one or more processing stations where the exposed portions of the disk in the carrier are coated on both sides by magnetic material to form a "processed" disk. The panel is then conveyor returned to the panel load/unload station 9 for removal of processed disks therefrom and insertion of new blank disks. As shown by arrow 46, the top edge of panel 10 may be tilted back a few (1–2) millimeters from the vertical to facilitate insertion of the plugged disk into the panel groove and recess. Robot arm 50 shown in the full line illustration at position A approaches and grabs by suitable jaws the knob 24 of a plug 20 which has been previously inserted into the central aperture of disk 23. The robot may be a Seiko Model RT3000 type robot or any horizontally articulated type robot. The robot arm 50 moves to position B with its gripped disk and positions the new blank disk in an aperture 11 in carrier panel 10. In the initial panel loading operation the robot would then return to pick up succeeding new blank disks at position A for moving and insertion in the panel at position B'. As the robot arm 50 moves from A to B, linearly moving common plugging arms 40, 41 place the two plug halves 21, 27 (FIG. 4) into a new blank disk. Arm 41 is shown broken away for clarity. The end of each plugging arm includes gripping or jaw means 42 for grasping the knobs 24, 28 of plug 20 so that the halves of the plug are inserted into the disk central aperture from opposite sides for mating to each other.

After arms 40, 41 have inserted a plug into the disk aperture, the jaws 42 retract leaving the disk plugged and the arms retract (arrow 43) allowing robot 50 to pick up the plugged disk by one of the plug knobs.

Figure 6:
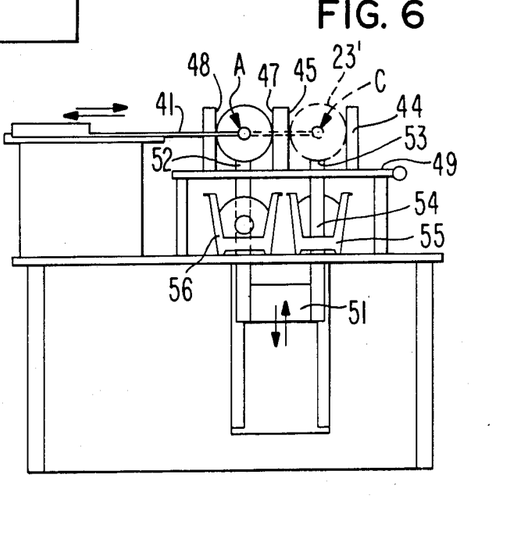
FIG. 6 is a schematic end view of a cassette system with disk ejection unit and disk plug and disk unplug stations.

When the disks in the panel have been processed, i.e. sputter coated, the carrier panel 10 returns to the position shown in FIG. 5 where the robot arm 50 in position B (or positions B' etc. at different disk apertures in the corresponding panel) grasps a processed disk and transports it to a position adjacent to position C for insertion in guideways 44, 45 at the unplugging station. The robot arm jaws 39 release the processed disk, the robot arm moves aside and the arms 40, 41 are extended, as shown by the dash-dot lines, to the unplugging position. The jaws 42 grasp the plug knobs, the arms separate or retract to separate the plug halves and remove the plug from the processed disk. The processed disk is then guided by guides 44, 45 and a support member 53 and 54 into a finished disk cassette (FIG. 6). The arms 40, 41 then move linearly back to the plug station where they reinsert the two plug halves which they still grasp into a new blank disk adjacent to robot position A. The jaws of arms 40, 41 then release the plug halves in the disk central aperture and the arms are retracted further to allow access of robot arm 50 to grip the plug knob on this next new disk for movement and insertion into the next aperture in the panel. The plugging position at A also has guideways 47, 48 for guiding and holding new disks exiting from the new blank disk cassette.

FIG. 6 is an end view of the disk transfer system shown in FIG. 5 particularly illustrating the movement of new blank disks from a first cassette and placement of processed disks into a second cassette. Arms 40, 41 move on a bar drive or other translating device to a position to plug new blank disk 23 at position A and subsequently to unplug processed disk 23' at position C. New blank disks are contained in an internally side-grooved cassette and the cassette is positioned under a support table or bridge 49. A pusher mechanism 51 having a push arm 52 passes through a bottom slot in the cassette below a held disk, abuts the bottom of the disk and pushes it upwardly into guides 47, 48. The upper end of push arm 52 positions the blank disk to a vertical position where it is plugged by action of arms 40, 41 inserting a plug 20. When robot 50 returns a processed disk to guides 44, 45 the disk is supported by the upper end 53 of push rod 54 which then lowers the processed disk into cassette 55. When cassette 56 is entirely indexed and emptied of new disks at position A it is moved to position C to receive processed disks which nestle in the internal side grooves of the cassette. Cassettes 56 and 55 are indexed so that they move under the plugging and unplugging stations more particularly under the guides to position each disk in the cassette in seriatim to be pushed upwardly or carried downwardly in arms 52, 54 to support a new disk and processed disk, respectively. Arms 52, 54 are tied together so that when a completed processed disk 23' is brought to position C by robot 50 the arm 54 is in the up position to support it and arm 52 has brought up a new disk for plugging at position A. After the arms 40, 41 unplug the completed finished disk 23' delivered at position C by the robot 50, the arms 52, 54 retract downwardly leaving the finished disk in the cassette 55 and to be clear of the bottom of the cassettes. Arm 52 comes down empty since robot 50 has taken the plugged disk 23 away to panel 10. The cassettes are then indexed one notch to line up with the bottom of the next new blank disk in slotted cassette 51 and the bottom of the next empty slot in cassette 55 and the respective guides. In the sequence described above the arms 40, 41 do all the plugging and unplugging of plugs into and from the disks 23 and 23'. In other embodiments hereafter described the robot 50 is modified to play a part in plugging and unplugging. Also in the other embodiments, the disk lifters 52, 54 can be moved independently to exit and receive disks and the corresponding cassettes 56, 55 indexed independently, in order to decrease cycle time.

Figures 7, 8:
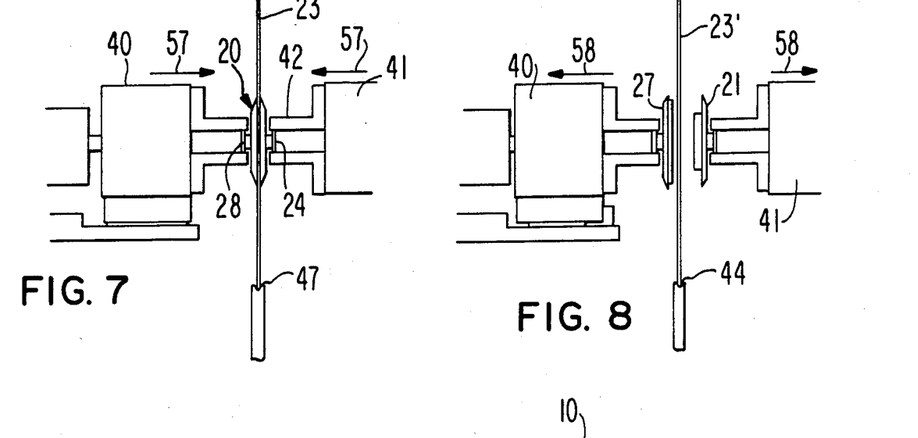
FIG. 7 is a schematic side view of a blank disk and disk plugging operation.
FIG. 8 is a schematic side view of a processed disk unplugging operation.

FIGS. 7 and 8 show the plugging and unplugging action of arms 40, 41 where gripping jaws 42 grasp the respective knobs 28, 24 of plug 20. Arrows 57 show the inward movement of the jaws to seat the two halves of the plug within the central aperture of new disk 23 as held in guide 47. FIG. 8 illustrates the separation of plug halves 21, 27 from finished disk 23' by outward movement of arms 40, 41 in the direction of arrows 58.

Figure 9:
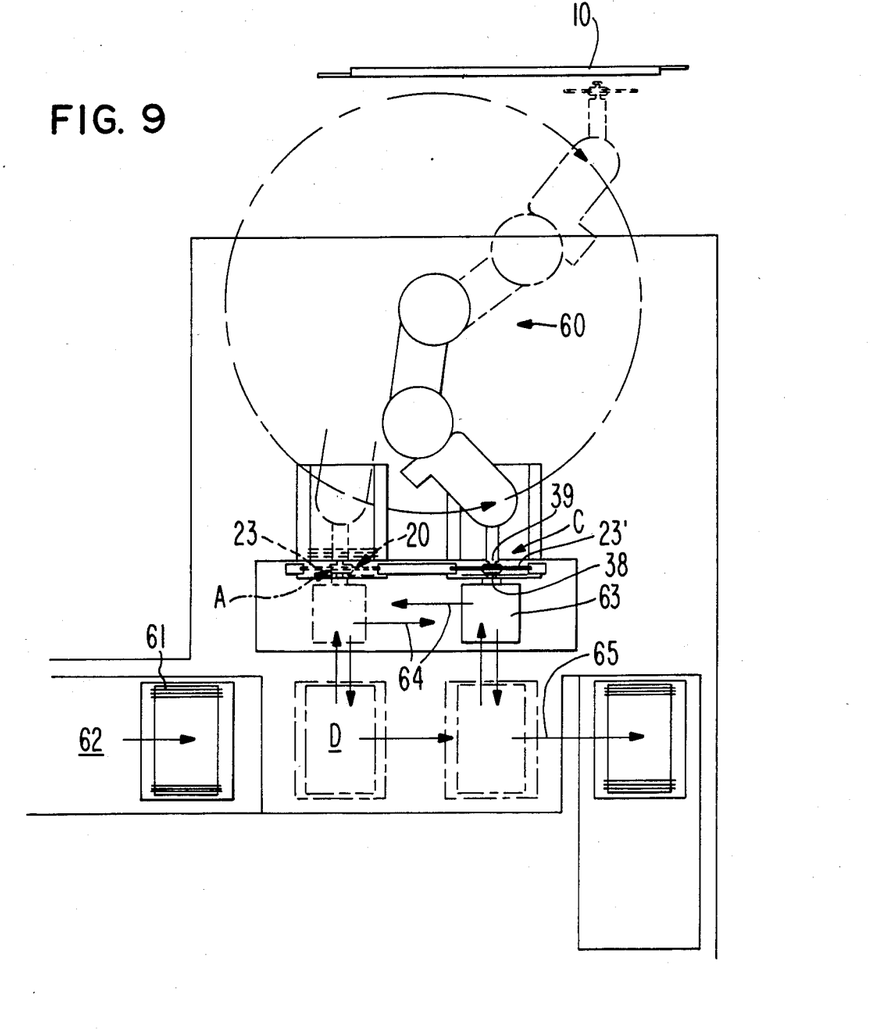
FIG. 9 is a schematic top view showing another type of disk plugging and unplugging system as well as the transfer of a blank disk from a first cassette where a plug has been inserted into a blank disk to the panel and return of a processed disk to a second finished disk cassette where the plug is removed and ready for movement to be reinserted in a new blank disk.

FIG. 9 illustrates the use of a horizontally articulated type robot 60, such as a Seiko SCARA Model TT2000 robot, in conjunction with a parallel-type cassette movement. A cassette 61 is conveyed by a conveyor 62 into a position D where it is advanced to a lateral position A under the plugging station where it is indexed to present successive new disks for plugging. The robot 60 in this embodiment side in plugging one half of plug 20 into the disk central aperture which enters the aperture from a direction facing the panel 10. The other plug half is inserted into the new disk 23 from the opposite side of the disk 23 by a single translating plug/unplug arm 63 having suitable jaws 38 for grasping a plug section knob. Arrows 64 show the translating movement. After a cassette 61 has been emptied at position A of blank disks and an earlier cassette filled with processed finished disks at position C, the empty and filled cassettes are laterally moved back to conveyor 62 for subsequent movement to position C or off the conveyor is shown by arrow 65, respectively. In this embodiment robot 60 installs one-half of the plug in the disk at position A with the other half of the disk inserted by arm 63. After release of the plug by arm 63, the robot 60 still gripping the overall plug is then able to move to the panel to deliver a blank disk to an empty disk-holding aperture and to pick-up a finished disk from the next diskholding aperture for delivery to position C for unplugging by the combined plug release and retracting action of robot jaws 39 and gripping means 38 on linearly moved arm 63.

Figure 10:
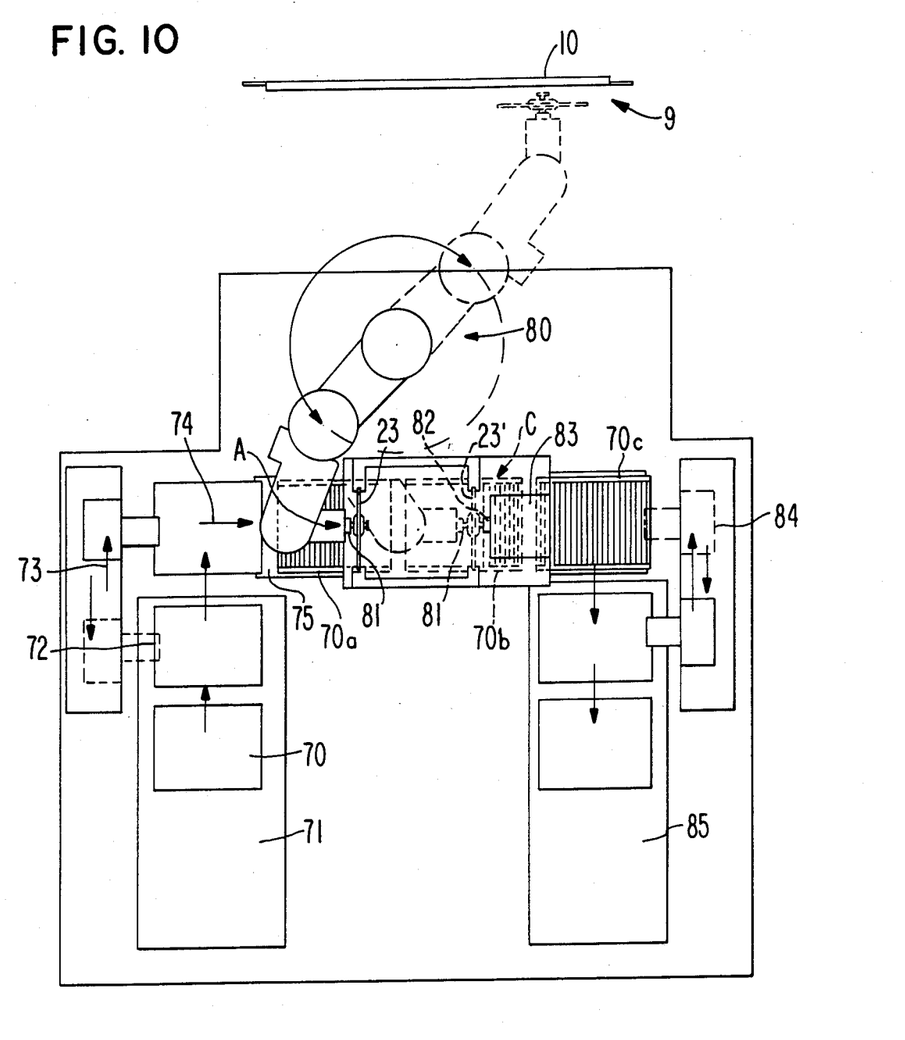
FIG. 10 is an alternative embodiment showing an in-line movement of cassettes to the plug insertion and the plug removal positions.

FIG. 10 shows a serial embodiment of cassette movement. The cassettes 70 are conveyed by conveyor 71 and are lifted by grabber arms 72 and moved (arrow 73)

to a position on a belt 75 parallel to panel 10 where the cassette can be advanced (arrow 74) under plug load position A. As described above, new disks are pushed out in seriatim from the cassette 70a to be plugged by action of robot 80 which has plug gripping jaws 81 and the jaws 82 of plugging arm 83 which inserts at position A the other half of the plug into the disc 23. Arm 83 then retracts to the position shown so that it can unplug a disk half from finished disk 23' when it is delivered to position C by robot 80. The finished disk, after unplugging by the robot gripping jaws 81 and the jaws 82 of actuator arm 83, is guided into finished disk cassette 70b which precedes cassette 70a on indexing conveyor 75. Robot 80 with half of a plug attached returns to position A to plug a new disk. Arm 83 with the other half of the plug attached also returns to position A to insert into the disk aperture its disk half with the disk half held by the robot. As can be seen each cassette is used serially. When a cassette 70a with new disks is emptied, it then is moved to the next position (cassette 70b) where it is then filled with finished disks from panel 10. Panel 10, of course, after filling with new disks is conveyed through a disk coating circuit and after processing is returned to the position 9 shown for removal of finished disks and insertion of new blank disks. Lastly, a second gripper 84 lifts a cassette 70c filled with finished disks and moves it onto conveyor 85 for cassette packing or storage.

Figure 11:
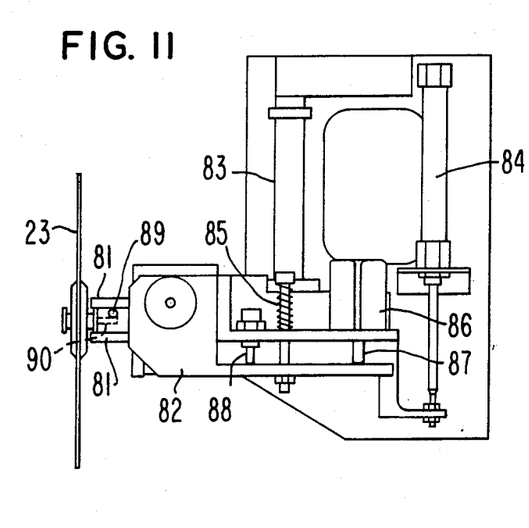
FIG. 11 is a schematic side view of a plug gripping and disk tilting mechanism for accurate placement of blank disks into disk-holding apertures in the carrier panel.
Figure 12:
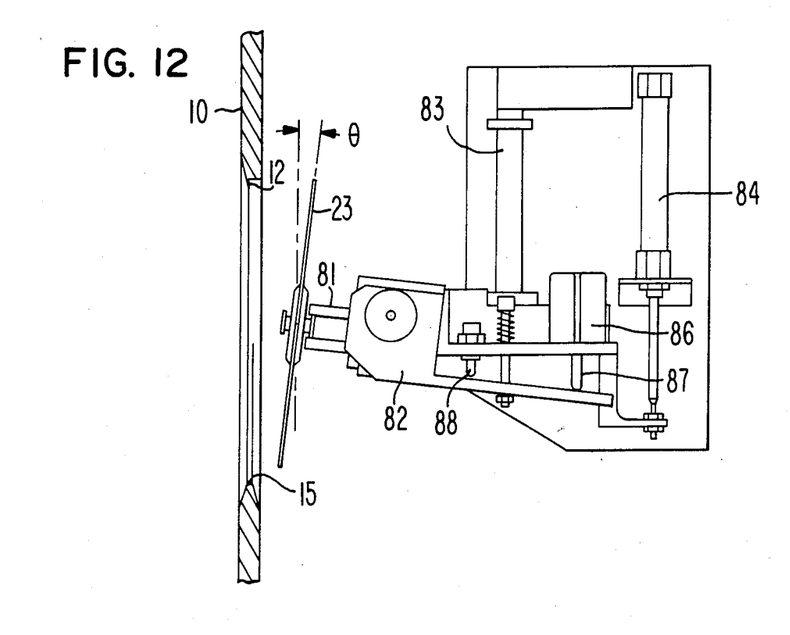
FIG. 12 is schematic partial cross-sectional view of the invention showing a tilting of the disk to facilitate entry or removal of a blank or processed disk into and from the carrier panel disk-holding aperture, respectively.

FIG. 11 shows in detail gripping jaws 81 on the end of robot arm 82 which are movable to grasp and ungrasp a plug knob. A pair of double actuated pistons 83, 84 are used to physically lower the gripper arm 82 to extend its vertical reach as it loads various rows on the carrier panel. Thus the gripper can be moved downwardly to reach lower horizontal row(s) of the disk-mounting apertures in the carrier panel. A return spring 85 aids in returning the gripper head from the extended position and further acts as a dampener for the extension motion. A third piston 86 with piston rod 87 is provided wherein downward motion i.e. stroke, of rod 87 (FIG. 12) tilts arm 82 at a prescribed ½° to 5° tilt angle away from the panel 10 to facilitate entrance of the disk into groove 15. The piston rod is then returned to its initial position (FIG. 11) so that the top edge of the disk rests in recess 12. The jaws 81 are then opened and the head 82 moved away leaving the plugged disk in the carrier panel. A positive adjustable stop 88 is provided. If desired an auxiliary vacuum line 89 may be employed having a suction opening 90 located in the head opposite the top of knob 28 for augmenting or otherwise holding the plug and disk or the plug half separately.

Figure 13:
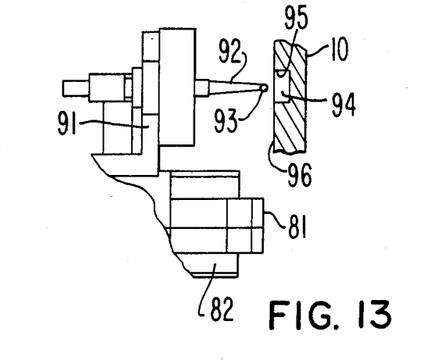
FIG. 13 is a partial cross-sectional detailed schematic view of the sensor probe and a panel depression for precisely aligning the robotic arm with the disk-holding apertures in the carrier panel.

FIG. 13 shows a sensor-holding arm 91 mounted to and along side gripping arm 82. Extending from the sensor arm is a linearly movable sensor probe 92 having a tip 93 which probes the location of indexing depressions 94 formed between the disk-mounting apertures 11 and panel 10 (FIG. 1) to accurately and precisely position the robot arm 82 with respect to the centers of apertures 11. Probe 92 translatably moves along panel surface 96 until it "finds" or locates depression 94. It then probes each of the rectangular sides 95 (x-y axes) and bottom (z axis) of one depression which spacially locates that depression. It then moves on to another depression and another and spacially locates by known computer means and methods each depression. Thus the panel is precisely spacially located even if the panel is slightly canted or warped which allows the robot to accurately position a plugged disk in each panel aperture. Probe 92 may be of the strain gage contact type sensor such as the Model 3D Contact Sensor made by Repic, Inc. of Tokyo, Japan.

Figure 14:
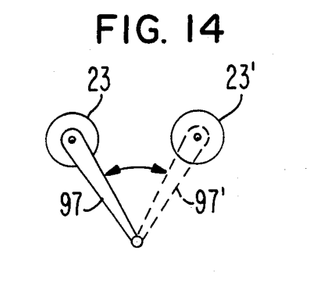
FIG. 14 is an embodiment of the invention in which one or a pair of plugging and unplugging robotic arms are rotatively movable in such functional positions.

FIG. 14 illustrates an embodiment of the plug and unplug arm in which an arcuate or rotary movement moves the arms to and fro plugging and unplugging positions. Arm 97 is arcuately movable after plugging a new blank disk 23 to dotted position 97' to unplug processed disk 23'. It then moves back, still holding a removed plug section, to plug the next blank disk to be plugged. Arm 97 may be a two-arm structure whereas in FIG. 5 the arm mechanism alone, without the robot 50, does the plugging and unplugging from opposite sides of the disk and retracts from the plugging position to allow pick up of a plugged disk by the robot jaws (FIG. 9).

The above description of embodiments of this invention is intended to be illustrative and not limiting. Other embodiments of this invention will be obvious to those skilled in the art in view of the above disclosure.

We claim:

1. A robotic disk handler system comprising:
   a carrier panel;
   aperture means in said carrier panel for mounting a series of blank disks in said carrier panel, each of said disks having a central aperture;
   a central plug for temporarily closing said central aperture and for holding each said disk;
   a first disk cassette provided at a plugging station for holding unprocessed blank disks; a second disk cassette provided at an unplugging station for receiving processed disks;
   first means for inserting a central plug into a disk aperture of a blank disk;
   first robotic arm means grippable on said plug for transporting and inserting successive ones of said blank disks from said first disk cassette into said carrier panel;
   means, including said first robotic arm means grippable on said plug, for removing a processed disk from said carrier panel and transporting said disk to said second disk cassette; and
   second means for removing said plug from a processed disk, for inserting said processed disk into said second disk cassette and for returning said plug for attachment to another blank disk in said first disk cassette.

2. The invention of claim 1 including means for moving said first disk cassette after removal of all blank disks from said first disk cassette to a position at said unplugging station such that said first disk cassette serves as said second disk cassette for receiving processed disks.

3. The invention of claim 1 including plug grabber means on said first means for inserting, for grabbing said plug on opposite sides of said plug to insert said plug into said blank disk.

4. The invention of claim 1 further including means for indexing said first and second disk cassettes into successive positions for removal of successive blank disks from said first disk cassette and for return of successive processed disks to said second disk cassette.

5. The invention of claim 1 in which said central plug comprises two sections insertable into said central aperture from opposite disk sides and wherein said first robotic arm means includes means for grabbing a first section of said central plug on a first side of each disk and wherein said second means for removing said plug from a processed disk includes means for grasping a second section of said central plug on a second side of said each disk such that said central plug extends through said disk central aperture.

6. The invention of claim 1 further including means on said first robotic arm means for tilting said gripped disk with respect to said carrier panel such that a bottom edge of said disk is first inserted into said carrier panel.

7. The invention of claim 1 further including means for tilting said carrier panel and said robotic arm with respect to each other as said disk is transported to said carrier panel by said first robotic arm means.

8. The invention of claim 1 in which said first robotic arm means operates to transport and insert blank disks into said carrier panel while said second means operates to remove a plug from a processed disk, to insert a processed disk into said second cassette and to return said plug to said plugging station for attachment to another blank disk.

9. The invention of claim 1 in which said first robotic arm means successively moves from a processed disk pick-up position at said carrier panel, to a disk unloading position at said second cassette, to a blank disk load position at said first cassette, to a blank disk insert position at said carrier panel and back to another processed disk pick-up position at said carrier panel to pick-up another disk from said carrier panel.

10. The invention of claim 1 further including means on said first robotic arm means for sensing the actual position of said carrier panel with respect to a predetermined desired position of said carrier panel such that said first robotic arm means may be accurately positioned for inserting and removing said disk into and from said carrier panel disk mounting aperture means.

11. The invention of claim 10 in which said sensing means includes a sensor probe extending from said first robotic arm means to said carrier panel and wherein said carrier panel includes a series of indexing depressions on a surface facing said probe in position to be probed and positioned to indicate alignment of said first robotic arm means with said disk mounting aperture means in said carrier panel.

12. The invention of claim 1 further including means extendible within each of said first and second cassettes for ejecting in seriatim blank disks from said first cassette and for inserting in seriatim processed disks into said second cassette.

13. The invention of claim 1 in which said second means for removing said plug from a processed disk and said first means for inserting said plug into a blank disk comprises a dual arm linearly-actuated plug grabbing means for holding said plug.

14. The invention of claim 1 in which said second means for removing said plug from a processed disk and attaching said plug to a blank disk comprises a rotary-actuated grabbing means for holding said plug.

15. A plug insertion and plug removal system for a disk having a central aperture in which a two-section plug extends through said aperture, said system further comprising:
first means at a plugging station for insertion of said plug into a central aperture of a blank disk;
second means for transporting said blank disk and inserted plug to and from a disk mounting station;
third means at an unplugging station for receiving a disk and inserted plug from said disk mounting station and for removing said plug from a processed disk; and
fourth means for returning a removed plug to said plugging station for insertion of said plug into another blank disk.

16. The invention of claim 15 in which said plug comprises two sections extending into opposite sides of said disk central aperture and said second means for transporting comprises a robotic arm including a plug grabbing arm for grabbing one of said plug sections and said second means includes a second arm operable in unison with said robotic arm for grabbing the other of said plug sections during plug insertion and plug removal.

17. The invention of claim 15 in which said first and third means include a pair of common arms for inserting said plug into said blank disk and for removing said plug from said plugged processed disk.

18. The invention of claim 15 further including a blank disk cassette for supplying successive blank disks to said first means at said plugging station and a processed disk cassette for receiving successive processed disks from said third means at said unplugging station.

19. The invention of claim 18 further including indexing means to index said blank disk cassette and said processed disk cassette to supply successive blank disks to said first means and to receive successive processed disks from said third means, respectively.

20. The invention of claim 19 further comprising means for transporting said processed disk cassette from a position at said third means when said second cassette is filled with processed disks and means for moving said first cassette when emptied of blank disks to a position at said third means.

21. The method of loading a series of disks into a disk carrier panel comprising:
providing a panel having a series of disk-holding apertures;
providing a first cassette of blank disks, each disk having a central aperture;
ejecting a blank disk from said first cassette; manipulating at least one robotic arm to grasp, mount and insert a central plug into said blank disk's central aperture;
transporting said blank disk and plug by said at least one robotic arm to said panel and mounting said blank disk and plug in one of said disk-holding apertures;
moving said at least one robotic arm to another of said disk-holding apertures in said panel to grasp a processed disk and plug mounted in said panel;
transporting said grasped processed disk and plug by said at least one robotic arm to a position
adjacent a second cassette;
removing said plug from said processed disk; and
returning said removed plug to a position adjacent said first cassette for reinserting said plug into another blank disk ejected from said first cassette.

22. The method of claim 21 further comprising inserting a processed disk, after removal of said plug from said processed disk, into said second cassette.

23. The method of claim 22 further comprising moving said second cassette aside when said second cassette is filled with processed disks and moving said first cassette when the first cassette has been emptied of blank disks to a position where said first cassette functions as the second cassette to receive processed disks.

24. The method of claim 21 further comprising moving said at least one robotic arm to grasp and transport a blank disk and plug to said panel and a processed disk and plug from and to a position adjacent said second cassette; and moving a pair of robotic arms to insert a plug into a blank disk from said first cassette and to remove a plug from a processed disk at a position adjacent said second cassette.

25. The method of claim 21 further comprising moving said pair of robotic arms from blank disk plug inserting to processed disk plug removing positions and vice versa while said at least one robotic arm is transporting a blank disk and plug to and from said panel.

26. The method of claim 21 further comprising sensing the special position of said panel, and moving said at least one robotic arm with respect to the sensed position of said panel to precisely insert and remove each of said blank disks into and from respective ones of said series of panel disk-holding apertures.

27. The method of claim 21 further comprising tilting said blank disk and plug on said at least one robotic arm with respect to said panel to facilitate entry of said blank disk and plug into said panel disk-holding apertures and tilting said processed disk and plug on said robotic arm to remove said processed disk from said panel.

28. The method of claim 21 further comprising tilting an upper portion of said blank disk away from the panel so that a bottom portion of the blank disk first enters the panel disk-holding aperture.

29. The method of claim 28 in which said blank disk is tipped away from the panel at an angle of from about $\frac{1}{2}°$ to 5°.

30. A robotic disk handler system comprising:
a flat carrier panel;
a series of circular apertures extending through said carrier panel for mounting a series of circular blank computer memory disks in said carrier panel for processing, each of said disks having a central aperture;
disk cassette means for holding unprocessed blank disks and for receiving processed disks;
first robotic arm means grippably holding said disk at said disk central aperture for transporting and inserting successive ones of said blank disks from said disk cassette means into said carrier panel; and
means, including said first robotic arm means, for removing a processed disk from said carrier panel and transporting said processed disk to said disk cassette means.

31. The invention of claim 30 further including means for tilting said carrier panel and said robotic arm relative to each other such that the bottom edges of said blank disk are first inserted into said carrier aperture means.

* * * * *

UNITED STATES PATENT AND TRADEMARK OFFICE
CERTIFICATE OF CORRECTION

PATENT NO. : 4,735,540

DATED : April 5, 1988

INVENTOR(S) : Tu Chen et al.

It is certified that error appears in the above-identified patent and that said Letters Patent is hereby corrected as shown below:

Col. 1, line 11, "4,595,981" should read --4,595,481--.

Col. 6, line 43, "side" should read --aids--.

Col. 8, line 15, after "jaws" insert --39--.

Col. 11, line 7, "21" should read --24--.

Col. 11, line 25, after "said" and before "robotic" insert --at least one--.

Col. 12, line 26, "disk" should read --disks--.

Signed and Sealed this

Fifteenth Day of November, 1988

Attest:

DONALD J. QUIGG

*Attesting Officer*  *Commissioner of Patents and Trademarks*